(12) United States Patent
Chefalas et al.

(10) Patent No.: US 10,810,270 B2
(45) Date of Patent: Oct. 20, 2020

(54) WEB SEARCH BASED ON BROWSING HISTORY AND EMOTIONAL STATE

(71) Applicant: International Business Machines Corporation, Armonk, NY (US)

(72) Inventors: Thomas E. Chefalas, Somers, NY (US); James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 14/941,177

(22) Filed: Nov. 13, 2015

(65) Prior Publication Data

US 2017/0140049 A1 May 18, 2017

(51) Int. Cl.
*G06Q 30/00* (2012.01)
*G06F 16/9535* (2019.01)
(Continued)

(52) U.S. Cl.
CPC .......... *G06F 16/9535* (2019.01); *G06F 3/012* (2013.01); *G06F 3/013* (2013.01); *G06F 3/015* (2013.01); *G06F 3/0304* (2013.01); *G06K 9/00315* (2013.01); *G06Q 30/0242* (2013.01); *H04L 67/02* (2013.01); *H04L 67/10* (2013.01); *H04L 67/12* (2013.01); *H04L 67/125* (2013.01); *H04L 67/18* (2013.01); *H04L 67/22* (2013.01); *H04L 67/303* (2013.01); *G06F 2203/011* (2013.01); *G06K 9/00228* (2013.01)

(58) Field of Classification Search
None
See application file for complete search history.

(56) References Cited

U.S. PATENT DOCUMENTS 8,209,331 B1  6/2012  Garg et al.
8,805,828 B1  8/2014  Ngo et al.
(Continued)

OTHER PUBLICATIONS

Heraz et al., "Towards a Brain-Sensitive Intelligent Tutoring System: Detecting Emotions from Brainwaves", Hindawi Publishing Corporation Advances in Artificial Intelligence, vol. 2011, Article ID 384169.

(Continued)

*Primary Examiner* — Alvin L Brown
(74) *Attorney, Agent, or Firm* — Samuel A. Waldbaum

(57) ABSTRACT

An embodiment of the invention provides a method for narrowing a user's web search based on the user's web browsing history, where a log of webpages downloaded by the user is generated. A search query is received in an interface; and, a processor connected to the interface filters results of the search query based on the log. The filtering of the results includes restricting results of the search query to only webpages that were downloaded by a user when the user was in a select emotional state, only webpages that were downloaded by the user when the user was located in a select geographic location, only webpages that were downloaded by the user from a select device, and/or only webpages that were downloaded by the user when at least one select application was running on a device that downloaded the webpages. The filtered results are displayed on a display connected to the processor.

13 Claims, 6 Drawing Sheets

(51) Int. Cl.
  *H04L 29/08* (2006.01)
  *G06Q 30/02* (2012.01)
  *G06K 9/00* (2006.01)
  *G06F 3/01* (2006.01)
  *G06F 3/03* (2006.01)

(56) References Cited

U.S. PATENT DOCUMENTS

| | | | |
|---|---|---|---|
| 8,874,592 B2 | 10/2014 | Flake et al. | |
| 2003/0133599 A1 | 7/2003 | Tian et al. | |
| 2013/0174009 A1* | 7/2013 | Saldanha | G06F 17/218 715/234 |
| 2014/0052542 A1* | 2/2014 | Zhang | G06Q 30/0269 705/14.66 |
| 2014/0358994 A1* | 12/2014 | Liu | H04L 67/26 709/203 |
| 2015/0317353 A1* | 11/2015 | Zavesky | G06F 17/30053 707/736 |
| 2015/0347420 A1* | 12/2015 | Glover | G06F 16/24578 707/728 |
| 2017/0308539 A1* | 10/2017 | Leicht | H04W 4/14 |

OTHER PUBLICATIONS

Blaszczak-Boxe, Agata, "Your Typing Style Can Reveal Your Emotions", [retrieved on Nov. 10, 2015]. Retrieved from the Internet: <http://www.livescience.com/48240-computer-system-detects-human-emotions.html>.

\* cited by examiner

WEB SEARCH BASED ON BROWSING HISTORY AND EMOTIONAL STATE

BACKGROUND

The present invention relates to systems, methods, and computer program products for a web search based on browsing history and emotional state. A neutral expressionless face is a relaxed face without contraction of facial muscles and without facial movements. It is the state of people's face most of the time. The appearance of a neutral face is needed for all existing automated facial expression analysis systems. That is, to classify a facial expression, a generic automated neutral expressionless face appearance is needed and provided by a human operator. Face expression classification then, in general, has three stages: (i) face detection and normalization; (ii) facial feature extraction and representation; and (iii) comparison of the feature representation to a feature representation of the hand-annotated neutral face appearance.

SUMMARY OF THE INVENTION

An embodiment of the invention provides a method for narrowing a user's web search based on the user's web browsing history, where a log of webpages downloaded by the user is generated. A search query is received in an interface; and, a processor connected to the interface filters results of the search query based on the log. The filtering of the results includes restricting results of the search query to only webpages that were downloaded by a user when the user was in a select emotional state, only webpages that were downloaded by the user when the user was located in a select geographic location, only webpages that were downloaded by the user from a select device, and/or only webpages that were downloaded by the user when at least one select application was running on a device that downloaded the webpages. The filtered results are displayed on a display connected to the processor.

Another embodiment of the invention includes a system having a means for generating a log of webpages displayed on a user device, and a means for receiving a search query from a user. The system further includes a means for filtering results of the search query based on the log, the results of the search query being filtered to only webpages that were displayed on the user device when a user was in a select emotional state, only webpages that were displayed on the user device when the user was located in a select geographic location, only webpages that were displayed on a select device, and/or only webpages that were displayed on the user device when at least one select application was running on the user device. Additionally, the system includes a means for displaying the filtered results.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
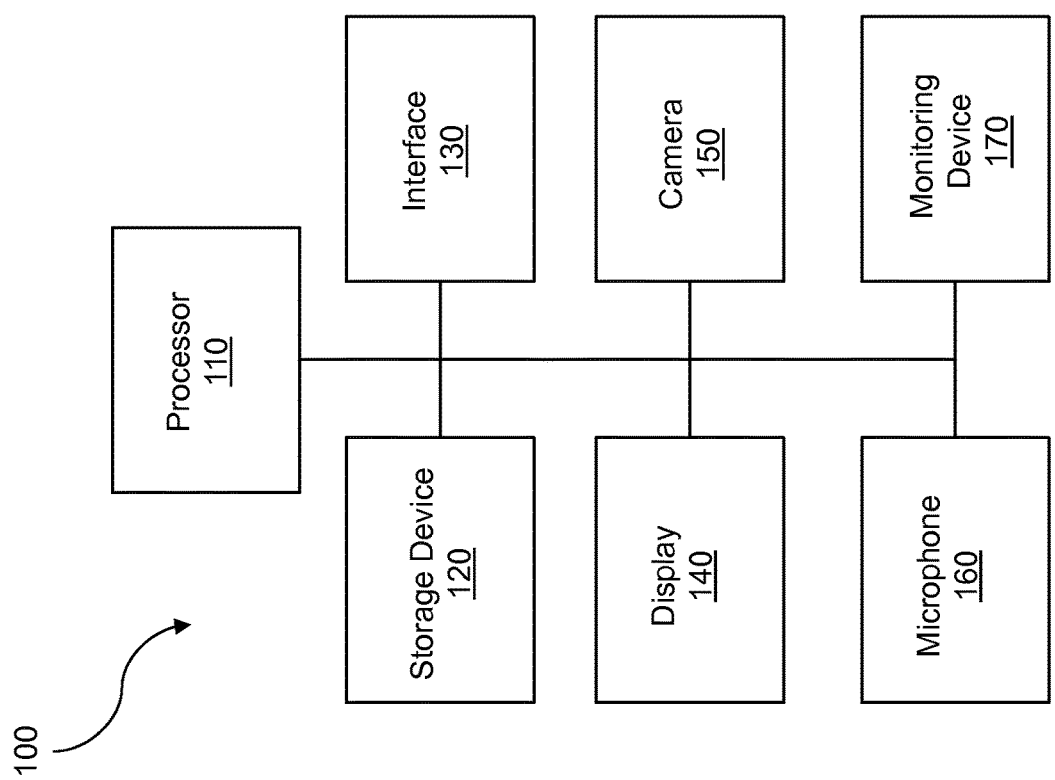
FIG. 1 is a diagram illustrating a system for a narrowing a user's web search based on the user's web browsing history according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system that performs searches of the Web and restricts the searches to any of: (1) searches with a particular user's history of searches, (2) searches performed by a user at a particular location, (3) searches performed by a user while that user was in a particular emotional state, (4) searches performed during a user's use of a particular class of device, and/or (5) searches performed in a context, as estimated by other open applications when a search was made. The user's history of searches may be restricted in time (e.g., the last 2 days).

Examples of the location include: home, work, city, location in a house, vacation spot, coffee shop, etc. The user's emotional state can be estimated by analysis of facial expressions (e.g., with a facial recognition application), typing characteristics, use of emoticons within time T of browsing, the time of day, holiday time (or the time of year), etc. One application related to emotion assessment reads a user's emotions on his or her face using face-tracking technology that allows computers to read facial expressions and determine the user's mood.

In one illustrative example, over the past 2 weeks, a user browses the Web and finds content that is interesting to her. Today, she wants to perform a Web search that is restricted only to those pages that she searched in the past 3 days. She has forgotten the website where she viewed the interesting content, but she remembers that she viewed the content in the last 3 days.

In another example, a user wishes to search past websites, restricting the Web search only to those websites that he visited at a particular location (e.g., the library). He does not recall the precise website he visited, but he recalls that he was at the library when he found the interesting Web content.

In yet another example, a user wants to search past websites, restricting the Web search only to those websites associated with a particular emotion (happy, sad, nervous, excited, angry, frustrated, etc.). At the time that the user viewed the past content, her mobile device identified that she was happy via a camera, a facial recognition application, and a SMS message that she sent less than a threshold amount of time after the webpage was downloaded (e.g., 5 minutes) that included a smiley face emoticon. She does not recall the precise website that she browsed in the past, but she recalls that she felt happy while browsing the website.

In still another example, a user remembers whether he was browsing on a small handheld mobile device or a larger electronic device, such as a desktop computer at home.

Thus, device class or type may be considered as a restriction when searching for past websites.

A user may also recall websites that were browsed during certain activities, such as reading a book, creating a presentation, or travelling. The system may identify such contexts by assessing what other applications were running on the user's device at the time the websites were browsed (e.g., an e-reader, word processor, slide presentation maker, GPS navigation). This context may be used to restrict or bias searches for past content browsed.

The system can create multiple tree text history entries in a tree text history section within the context of the search terms by associating with history data from various searches. A user's prior searching and browsing activities can be recorded for subsequent use. A user can examine his or her prior searching and browsing activities in a number of different ways, including indications of the user's prior activities related to the browsing (e.g., emotions, location, time of day).

Data about a user's activity and his or her emotional state during the activity can be logged in a history log. This may be used to bias and tailor future searches of past content on the Web.

Although the assessment of emotional or emotional state may be done automatically, the system can allow users to convey their emotional state of mind by means of selecting their mood from a toolbar when using applications such as, for example, instant messaging, SMS, MMS, emails, blogs, commenting, etc. Different moods could appear as different icons or in a drop-down box as text. Emotion intensity can be changed by a sliding bar present on the toolbar.

The method of searching for particular data (or a web page) can include receiving a query from a user for particular online data content, and searching for the particular online data content for a specified time duration of history. In addition, user location can be estimated by various means. These means can be extended (with user permission) to geographical information that may be extracted from a number of user-related sources, including IP addresses, wireless signal strength history (e.g., in the living room vs. bedroom), the web browser history, search history, maps history, address book, e-mail archives, and calendar entries. Such information could be used, if desired, to build a spatial index of specific physical locations for a geocoded result set.

Advertising can provide information relevant to a user's need, but when a user has not yet expressed that need explicitly (as in a search). The need can pertain to a need for information first, and the information need may be primary (as in a need for knowledge about a specific topic) or secondary (as in a need for information about the availability of a product or good at a particular store at a particular time). Both primary and secondary needs can be associated with both searching and advertising.

A primary need can be determined by a user's emotional state, cognitive state, disposition, or decision process. For example, reviews, technical specifications, and photographs, may relate specific information to a user that satisfies their primary need to make a decision, satisfy a subjective urge such as hunger, thirst, social status, etc. A secondary need can derive from obstacles to fulfilling a primary need, and can be determined by a user's environment. For example, a secondary need may be represented by a need to go to a specific store to acquire a good, to take a mode of transportation, or to identify the lowest price example of the item.

Given the equivalence between searching and advertising, the system can identify (not as in the previous examples, a search or website visited previously) but instead an advertisement encountered previously, based on the emotional, emotional, geographical, or other context in which an advertisement was encountered. An advertisement can be revisited that was originally encountered in any of the following contexts: a user's history of encountering the same advertising (frequency of occurrence), a particular location, a particular emotional state, a user's use of a particular class of device, and/or a context, as estimated by other open applications when an advertisement was presented.

Advertising may be contextual; however, human memory can be such that even when an advertisement is deemed valuable and interesting to a viewer in a particular context, the viewer may forget about the advertisement and its context (e.g., when and where the advertisement was encountered). The system can allow a user to recall advertisements more easily when in a particular state of recognition that the item advertised item is now needed and a purchase may be initiated.

For example, a user who is in need of a new car may recognize this need but suppress it when an advertisement for a desirable replacement car is encountered. This suppressing behavior may be due to a concern about the price of a car relative to a person's available cash or credit. Often a person will say, "I'll buy X when I have the money." However, as is typical of brain-based memory, the need for the car may be recalled, but the specific car X may not be recalled, when cash or credit has become available.

The system can identify and store a "latent advertising hit" by monitoring the emotional response of a user to an advertisement. Further, the system can allow a user to provide feedback that an advertisement was interesting and provide information about a product that the individual needs or will need, but that the user cannot act on this need at this time. In this way, a user may have a ranked list of advertisements that they have responded to based on emotional response, but which, for whatever reason, they did not act on.

This can be useful in many contexts, for example when trying to decide what type of car to buy. In addition, an emotional response to an advertised movie or television program can be logged and referenced at a future date when free time allows a user to watch television or a movie, and the individual is trying to remember what movies they are interested in watching. For emotional context, the movies may be listed according to previous emotional responses to advertising, thereby assisting the selecting of a movie to watch. The system can determine the user's emotional context or emotional state by analysis of facial expressions, typing characteristics, use of emoticons within time T of browsing, time of day, holiday time, etc.

Figure 2:
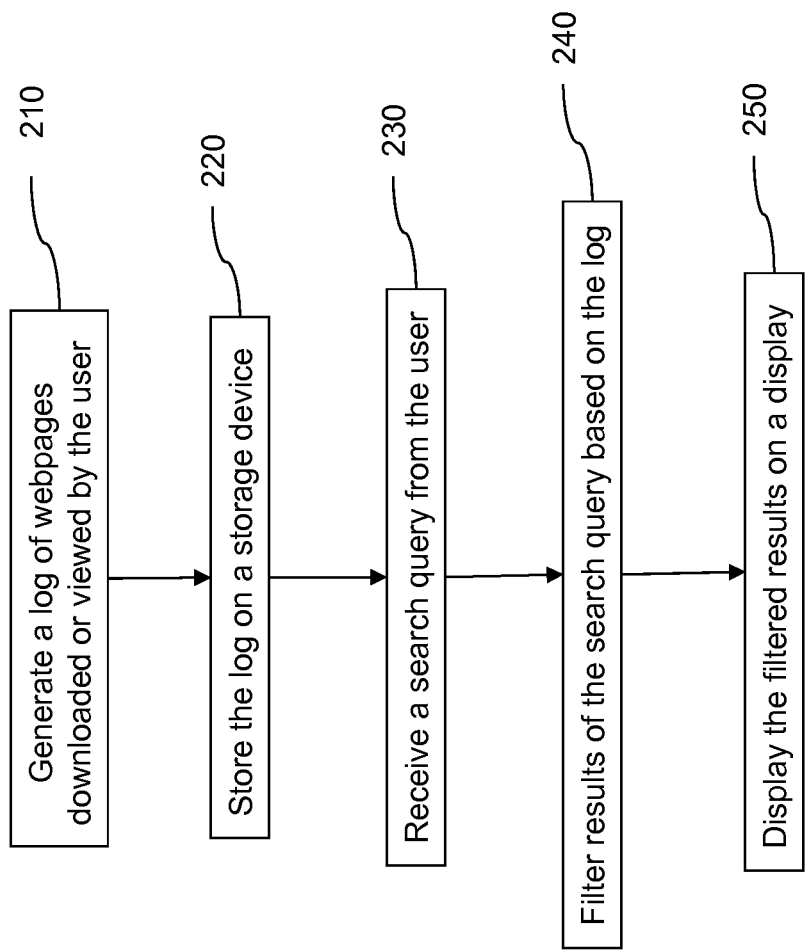
FIG. 2 is a flow diagram illustrating a method for narrowing a user's web search based on the user's web browsing history according to an embodiment of the invention.

FIG. 1 is a diagram illustrating a system 100 for a narrowing a user's web search based on the user's web browsing history according to an embodiment of the invention. FIG. 2 is a flow diagram illustrating a method for narrowing a user's web search based on the user's web browsing history according to an embodiment of the invention (e.g., using the system 100). A processor 110 can generate a log of webpages downloaded or viewed by the user (210). As used herein, the term "download" can include the act of temporarily or permanently moving or copying a file, program, or other item from a computer or computer system to another computer or device. As used herein, the term "view" can include the act of seeing or examining (e.g., viewing a webpage on a computer or device). In at least one embodiment, the processor 110 determines that a webpage has been viewed by a user via a camera 150 connected to the processor 110, where the camera 150 captures images of the user's eyes looking at the monitor displaying the webpage and an amount of time that the user's eyes are captured by the camera 150. The term "displaying" in at least one embodiment is the placement of the window for the browser with the webpage viewable by the user. The processor 110 can deem that the webpage has been viewed by the user when the camera captures the user's eyes for a threshold amount of time (e.g., 5 seconds).

The log can be stored on a storage device 120 connected to the processor 110 (220). As used herein, the term "connected" includes operationally connected, logically connected, in communication with, physically or wirelessly connected, engaged, coupled, contacts, linked, affixed, and attached. The storage device may also be referred to herein as the "means for storing the identified emotional state of the user", the "means for storing the identified geographic locations", the "means for storing the identified devices", the "means for storing the identified applications", and/or the "means for storing the identified emotional state of the user". In at least one embodiment, when multiple storing means are present, they share a common storage device.

An interface 130 connected to the processor 110 can receive a search query from the user (230). As used herein, the term "interface" (also referred to herein as the "means for receiving a search query") is a computer hardware device, such as, for example, a keyboard, a mouse, a microphone, a touchpad, a touchscreen, a joystick, a controller, a camera, a disk drive, a port, etc. The processor 110 can filter results of the search query based on the log (240).

More specifically, the processor 110 can filter or restrict results of the search query to only webpages that were downloaded by a user when the user was in a select emotional state (e.g., excited) and/or only webpages that were downloaded by the user when the user was located in a select geographic location (e.g., only webpages that were downloaded when the user was at home). In another embodiment, the processor 110 can filter or restrict results of the search query to only webpages that were downloaded by the user from a select device (e.g., the user's mobile telephone) and/or only webpages that were downloaded by the user when at least one select application was running on a device that downloaded the webpages (e.g., GPS navigation application). In a further embodiment, multiple filters may be used. The filtered results can be displayed on a display 140 (e.g., monitor, screen) connected to the processor 110 (250). The display may also be referred to herein as the "means for displaying the filtered results".

In at least one embodiment, the processor 110 can be connected to the interface 130, a camera 150, a microphone 160, and/or a monitoring device 170 to identify the emotional state of the user when the user downloaded each of the webpages. The terms "means for identifying an emotional state of the user" can also be referred to herein as the processor, camera, microphone, and/or monitoring device. The emotional state can be identified a predetermined amount of time before and/or after a webpage is downloaded or viewed by the user (e.g., 10 seconds after the download has been completed).

The emotional state of the user can be identified with the camera 150 and a facial recognition program (e.g., frown, smile) and/or the microphone (e.g., laugh, sigh, growl, cry, keywords (e.g., "yay", "oh no", "yes", "what?", "omg")). In another embodiment, the emotional state of the user is determined from input from the user via the interface 130, the input including an emoticon entered by the user, a mood selected by the user, a status update entered by the user, a heart rate entered by the user, a blood pressure entered by the user, and/or a level of perspiration entered by the user. The emotional state of the user can be determined from the typing characteristics of the user (e.g., amount of pressure, time of keystrokes, including length of keystroke and speed of keystrokes). In at least one embodiment, emotions that are identifiable from the user's typing characteristics can include joy, fear, anger, sadness, disgust, shame, and guilt.

In yet another embodiment, the emotional state of the user is determined from a monitoring device 170 connected to the user, such as, for example, a smartwatch or other wristband, an electroencephalogram (EEG) device, and/or an implanted medical device. The monitoring device 170 can monitor the user' heart rate, blood pressure, level of perspiration, and/or brain waves. An EEG device can be used to measure emotional dimensions (e.g., pleasure, arousal, and dominance), emotions that can occur during learning (e.g., anger, boredom, confusion, contempt, curiosity, disgust, eureka, and frustration), and/or the emotional valence positive for learning and negative for learning. The EEG device can be interfaced with the user's computing device, which can perform emotion detection algorithms on the brain wave patterns captured by the EEG device.

The identified emotional state of the user can be stored in the log as part of a log entry for the respective webpage; and, the filtering of the results of the search query to webpages that were downloaded or viewed by the user when the user was in the select emotional state can be based on the log. For example, a log file may include the URL of a web page, along with a tag corresponding to an average emotion exhibited while viewing the webpage (e.g., as gleaned by an analysis of facial expressions and other factors). Other information may also be included for each URL, such as, for example "http://www.uspto.gov, date/time, delight level of 9 on a scale from 0 to 10." In at least one embodiment, such information is encrypted and/or stored when a user opts in to this service.

The geographic location of the user when the user downloaded each of the webpages can be identified, for example, with a GPS device (also referred to herein as the "means for identifying a geographic location of the user"). The geographic location of the user can also be identified with cell phone tower triangulation, an IP address for the accessing device, a wireless signal strength history, and/or the user's calendar entries. The identified geographic locations can be stored in the log as part of a log entry for the respective webpage; and, the filtering of the results of the search query to webpages that were downloaded by or viewed the user when the user was located in the select geographic location can be based on the log.

For example, a log file may include the URL of a webpage, along with a tag corresponding to location (e.g., GPS coordinate) and an estimated higher-level descriptor of the location (e.g. coffee shop, home, cruise ship, library, car dealer repair shop, barbershop, airport). Other information may also be included for each URL, such as, for example, "www.uspto.gov, date/time, latitude and longitude of an address, IP address, Joe's Coffee Shop, wireless signal strength history, calendar entry description of location, meeting topic, and attendees." This can be done in an opt-in basis so that a user's privacy is not involuntarily harmed, and such information can be deleted by the user.

Devices used by the user to download and/or display the webpages can be identified (e.g., the user's mobile telephone, tablet computer, work laptop computer, home desktop computer, and computers in the user's school computer lab); and, a list of the identified devices can be stored in the log as part of a log entry for the respective webpage. A processor (also referred to herein as the "means for generating a log of webpages displayed on a user device", the "means for generating a log of webpages viewed on a user device", the "means for filtering results of the search query", the "means for identifying devices used to download the webpages", the "means for identifying devices used to display the webpages", the "means for identifying at least one application running on the user device", the "means for identifying an emotional state of the user when each of the advertisements was viewed by the user", and/or the "means for generating a list of advertisements of interest to the user") can identify the devices used by the user to download and/or display the webpages. The filtering of the results of the search query to webpages that were downloaded or viewed by the user from the select device can be based on the log stored on the storage device.

Applications running on devices used by the user to download and/or view the webpages at the time that the webpages were downloaded and/or viewed by the user can be identified. For example, the processor 110 identifies that during the user's last browsing session, XYZ Word Processing Program was running on the user device when the first 27 webpages were downloaded, and that ABC Spreadsheet Program was running on the user device when all 51 webpages were downloaded. Another example of an application is an app running on a smartphone being used to browse a webpage. A list of the identified applications can be stored in the log as part of a log entry for the respective webpage. The filtering of the results of the search query to webpages that were downloaded or viewed by the user when one or more select applications were running on the device that downloaded and/or displayed the webpages can be based on the log. The terms "applications running on the device" includes applications that are open on the device.

An emotional state of the user when each of the advertisements were viewed by the user can be identified, for example, with the processor 110, the interface 130, the camera 150, the microphone 160, and/or the monitoring device 170. The identified emotional state of the user can be stored in the log as part of a log entry for the respective webpage. The processor 110 can generate a list of advertisements of interest to the user based on the log.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
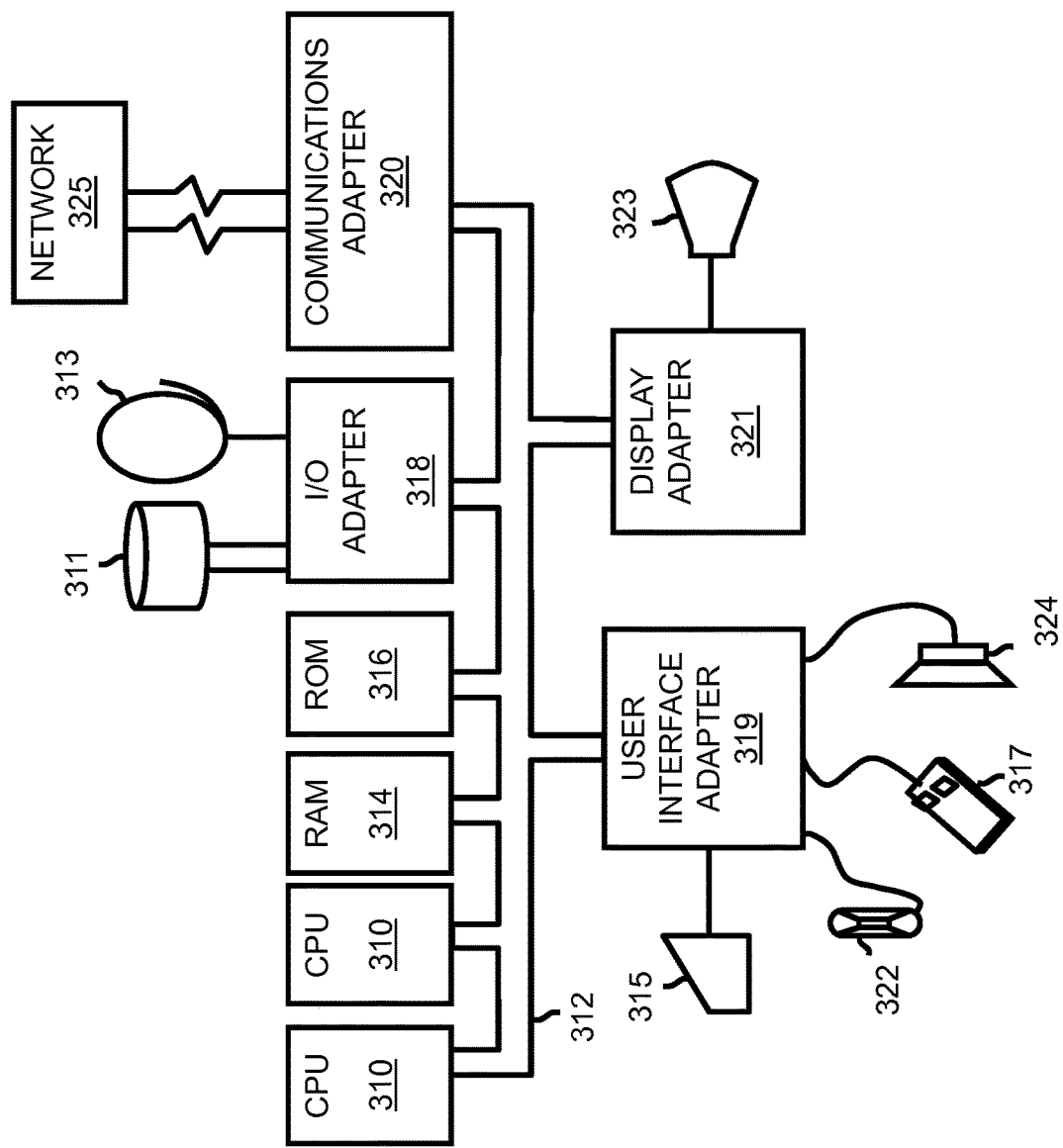
FIG. 3 is a diagram illustrating a computer program product according to an embodiment of the invention.

Referring now to FIG. 3, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 310. The CPUs 310 are interconnected with system bus 312 to various devices such as a random access memory (RAM) 314, read-only memory (ROM) 316, and an input/output (I/O) adapter 318. The I/O adapter 318 can connect to peripheral devices, such as disk units 311 and tape drives 313, or other program storage devices that are readable by the system. The system can read the inventive instructions on the program storage devices and follow these instructions to execute the methodology of at least one embodiment of the invention. The system further includes a user interface adapter 31 that connects a keyboard 315, mouse 317, speaker 324, microphone 322, and/or other user interface devices such as a touch screen device (not shown) to the bus 312 to gather user input. Additionally, a communication adapter 320 connects the bus 312 to a data processing network 325, and a display adapter 321 connects the bus 312 to a display device 323 which may be embodied as an output device such as a monitor, printer, or transmitter, for example.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.'

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
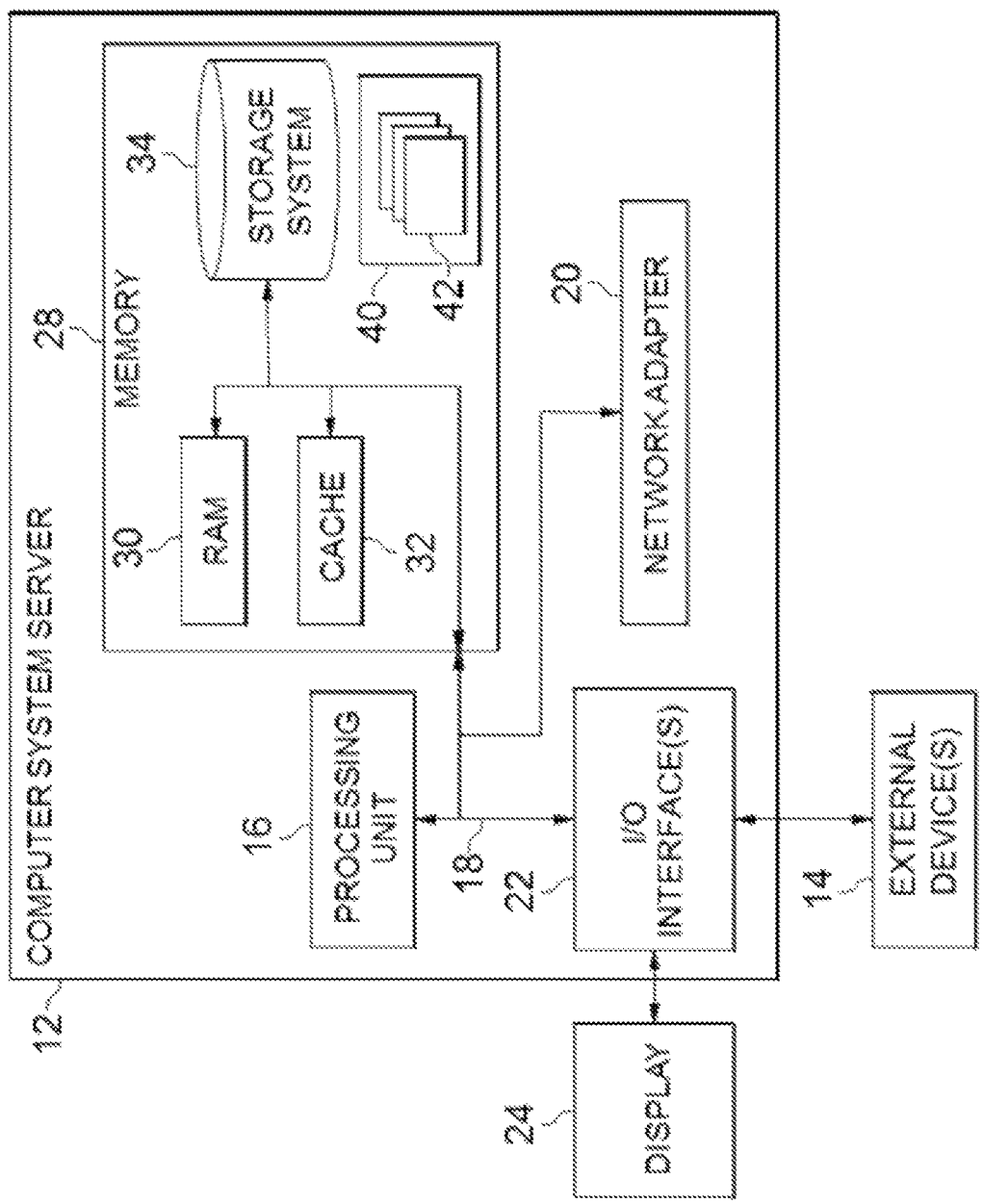
FIG. 4 depicts a cloud computing node according to an embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
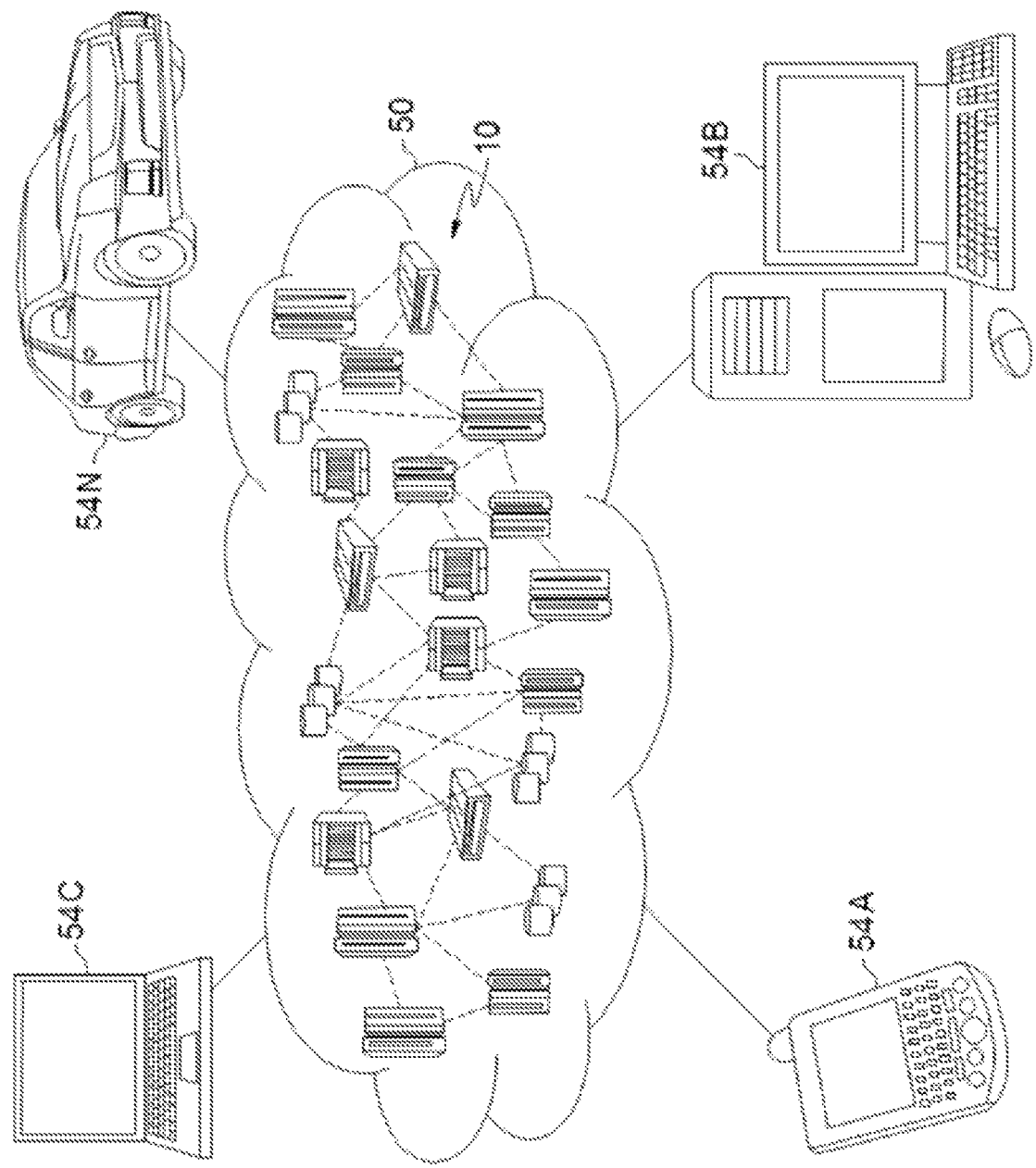
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
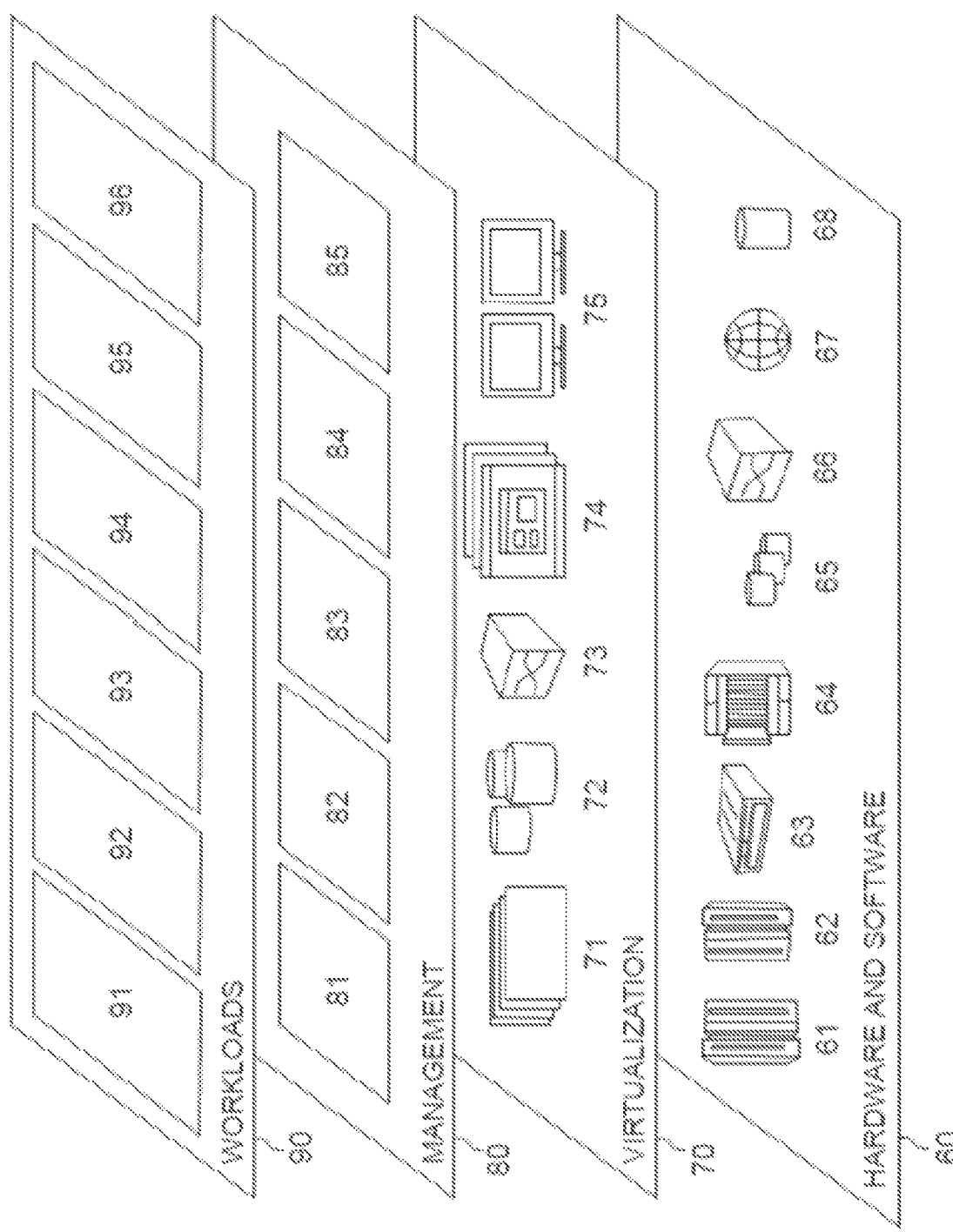
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and web search based on browsing history and emotional state 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for narrowing a user's web search based on the user's web browsing history, said method comprising:
    generating a user history comprising of:
        generating a log of webpages downloaded by the user;
        receiving a search query in an interface;
        identifying types of devices used by the user to download the webpages;
        storing a list of each type of identified device in the log as part of a log entry for each respective webpage;
        identifying an emotional state of the user when the user downloaded each of the webpages, wherein said identifying of the emotional state of the user includes:
            analysis via a camera and a facial recognition program;
            input from the user, the input including: an emoticon entered by the user, a mood selected by the user, a status update entered by the user, a heart rate entered by the user, a blood pressure entered by the user, a level of perspiration entered by the user, and typing characteristics of the user;
            monitoring the user' heart rate by a monitoring device connected to the processor; monitoring the user's blood pressure by the monitoring device;
            monitoring the user's level of perspiration by the monitoring device; and
        monitoring the user's brain waves by the monitoring device;
        storing each identified emotional state of the user in the log as part of log entry for each respective webpage; and
    receiving a new search query, wherein the new search query is directed to searching the user history;
    filtering results of the new search query with a processor connected to the interface based on the user history, said filtering of the results including restricting results of the new search query to webpages that were previously downloaded by the user based on the type of device, or webpages previously downloaded by the user corresponding to a type of emotional state of the user at the time of the previous downloading and at least one of:
- webpages that were previously downloaded by the user when the user was located in a select geographic location;
- webpages that were previously downloaded by the user when at least one select application was running on a device that downloaded the webpages; and displaying the filtered results on a display connected to the processor.

2. The method according to claim 1, further comprising:
identifying at least one geographic location of the user when the user downloaded each of the webpages;
storing a list of the identified geographic locations in the log as part of log entry for the respective webpage,
wherein said filtering of the results of the search query to webpages that were downloaded by the user when the user was located in the select geographic location is based on the log.

3. The method according to claim 2, wherein said identifying of the at least one geographic location of the user includes identifying the at least one geographic location of the user based on at least one of GPS signal, cell phone tower triangulation, an IP address, a wireless signal strength history, and calendar entries.

4. The method according to claim 1, further comprising:
identifying applications running on devices used by the user to download the webpages;
storing a list of the identified applications in the log as part of log entry for each respective webpage,
wherein said filtering includes restricting results of the search query to webpages that were downloaded by the user when at least one select application was running on the device that downloaded the webpages.

5. The method according to claim 1, further comprising:
identifying an emotional state of the user when advertisements are being viewed by the user; and
storing the identified emotional state of the user in the log as part of log entry for the respective webpage.

6. The method according to claim 5, further comprising:
generating a list of advertisements of interest to the user based on the log.

7. A system comprising:
processing circuitry configured to:
  generate a user history comprised of:
    generate a log of webpages downloaded by a user,
    receive a search query from the user,
    identify types of devices used by the user to download the webpages;
    store a list of each type of identified device in the log as part of a log entry for each respective webpage,
    identify an emotional state of the user when the user downloaded each of the webpages, wherein said identifying of the emotional state of the user includes:
      analysis via a camera and a facial recognition program;
      input from the user, the input including: an emoticon entered by the user, a mood selected by the user, a status update entered by the user, a heart rate entered by the user, a blood pressure entered by the user, a level of perspiration entered by the user, and typing characteristics of the user;
    monitoring the user' heart rate by a monitoring device connected to the processor; monitoring the user's blood pressure by the monitoring device;
    monitoring the user's level of perspiration by the monitoring device; and monitoring the user's brain waves by the monitoring device
    store each identified emotional state of the user in the log as part of log entry for each respective webpage, and
  receive a new search query, wherein the new search query is directed towards the user history;
  filter results of the new search query based on the user history, said filtering of the results including restricting results of the new search query to webpages that were previously downloaded by the user based on the type of device, or webpages previously downloaded by the user corresponding to a type of emotional state of the user at the time of the pervious downloading and at least one of:
    webpages that were downloaded by the user when the user was located in a select geographic location;
    webpages that were downloaded by the user when at least one select application was running on the user device; and
  a display configured to display the filtered results.

8. The system according to claim 7, wherein the processing circuitry is connected to at least one of a camera, an interface, and a monitoring device.

9. The system according to claim 7, wherein the processing circuitry is further configured to
identify at least one geographic location of the user when the user downloaded each of the webpages, and
store a list of the identified geographic locations in the log as part of log entry for the respective webpages,
wherein the filtering further includes restricting results of the search query to webpages that were downloaded by the user when the user was located in the select geographic location.

10. The system according to claim 7, wherein the processing circuitry is further configured to
identify applications running on devices used by the user to download the webpages, and store a list of the identified applications in the log as part of log entry for each respective webpage,
wherein said filtering includes restricting results of the search query to webpages that were downloaded by the user when at least one select application was running on the device that downloaded the webpages.

11. The system according to claim 7, wherein the processing circuitry is further configured to
identify an emotional state of the user when advertisements are being viewed by the user, and
store the identified emotional state of the user in the log.

12. The system according to claim 11, wherein the processing circuitry is further configured to generate a list of advertisements of interest to the user based on the log.

13. A non-transitory computer-readable medium having stored thereon computer-readable instructions which when executed by a processor cause the processor to perform a method for narrowing a user's web search based on the user's web browsing history, the method comprising:
generating a user history comprising of:
  generating a log of webpages downloaded by the user;
  receiving a search query in an interface;

identifying types of devices used by the user to download the webpages;
storing a list of each type of identified device in the log as part of a log entry for each respective webpage;
identifying an emotional state of the user when the user downloaded each of the webpages, wherein said identifying of the emotional state of the user includes:
 analysis via a camera and a facial recognition program;
 input from the user, the input including: an emoticon entered by the user, a mood selected by the user, a status update entered by the user, a heart rate entered by the user, a blood pressure entered by the user, a level of perspiration entered by the user, and typing characteristics of the user;
 monitoring the user' heart rate by a monitoring device connected to the processor; monitoring the user's blood pressure by the monitoring device;
 monitoring the user's level of perspiration by the monitoring device; and
monitoring the user's brain waves by the monitoring device;
storing each identified emotional state of the user in the log as part of log entry for each respective webpage; and
receiving a new search query, wherein the new search query is directed to searching the user history;
filtering results of the new search query with a processor connected to the interface based on the user history, said filtering of the results including restricting results of the new search query to webpages that were previously downloaded by the user based on the type of device, or webpages previously downloaded by the user corresponding to a type of emotional state of the user at the time of the previous downloading and at least one of:
webpages that were previously downloaded by the user when the user was located in a select geographic location;
webpages that were previously downloaded by the user when at least one select application was running on a device that downloaded the webpages; and
displaying the filtered results on a display connected to the processor.

* * * * *